United States Patent
Trotter et al.

(10) Patent No.: US 8,175,762 B2
(45) Date of Patent: May 8, 2012

(54) ELECTRICALLY ACTIVATED AIRCRAFT LANDING GEAR CONTROL SYSTEM AND METHOD

(75) Inventors: Steven J Trotter, Kirkland, WA (US); Beth L Sundquist, Seattle, WA (US); Fredrick R Arslan, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 1043 days.

(21) Appl. No.: 12/018,291

(22) Filed: Jan. 23, 2008

(65) Prior Publication Data

US 2009/0187293 A1 Jul. 23, 2009

(51) Int. Cl.
*G06F 19/00* (2011.01)
*B64C 25/00* (2006.01)

(52) U.S. Cl. ...................................... 701/16; 244/100 R
(58) Field of Classification Search .................... None
See application file for complete search history.

(56) References Cited

U.S. PATENT DOCUMENTS

| | | |
|---|---|---|
| 2,316,683 A | 4/1943 | Finnegan |
| 2,420,066 A | 5/1947 | Conway |
| 5,023,604 A * | 6/1991 | Takase et al. ................. 370/434 |
| 5,446,666 A | 8/1995 | Bauer |
| 5,623,411 A * | 4/1997 | Morvan ........................... 701/14 |
| 6,575,405 B2 * | 6/2003 | Bryant et al. ............ 244/102 SL |
| 6,704,634 B1 * | 3/2004 | Gowan et al. .................... 701/70 |
| 6,820,946 B2 * | 11/2004 | Salamat et al. .......... 303/122.09 |
| 6,854,689 B1 * | 2/2005 | Lindahl et al. ............ 244/102 R |
| 2006/0293805 A1 * | 12/2006 | Garcia ............................. 701/16 |
| 2007/0142980 A1 * | 6/2007 | Ausman et al. .................... 701/3 |
| 2008/0030069 A1 * | 2/2008 | Griffith et al. .................. 303/20 |
| 2009/0050736 A1 * | 2/2009 | Bennett et al. ............ 244/102 R |

* cited by examiner

*Primary Examiner* — Khoi Tran
*Assistant Examiner* — Bao Long T Nguyen
(74) *Attorney, Agent, or Firm* — Klintworth & Rosenblat IP LLC

(57) ABSTRACT

An electrically activated landing gear control system is provided. A processing module of landing gear control system is provided with landing gear control system software that receives data relating to the position of a landing gear lever. Proximity sensors positioned at landing gear and wheel well areas of the aircraft are coupled for communication with the processing module. The proximity sensors provide the landing gear control system software with position data relating to the landing gear. The landing gear control software converts the data received from the landing gear lever and the data received from the proximity sensors to command signals to control electrically activated valves associated with landing gear components. The command signals may be sent simultaneously to remote power distribution units and remote data concentrator units to energize or de-energize solenoid coils of the electrically activated valves.

22 Claims, 1 Drawing Sheet

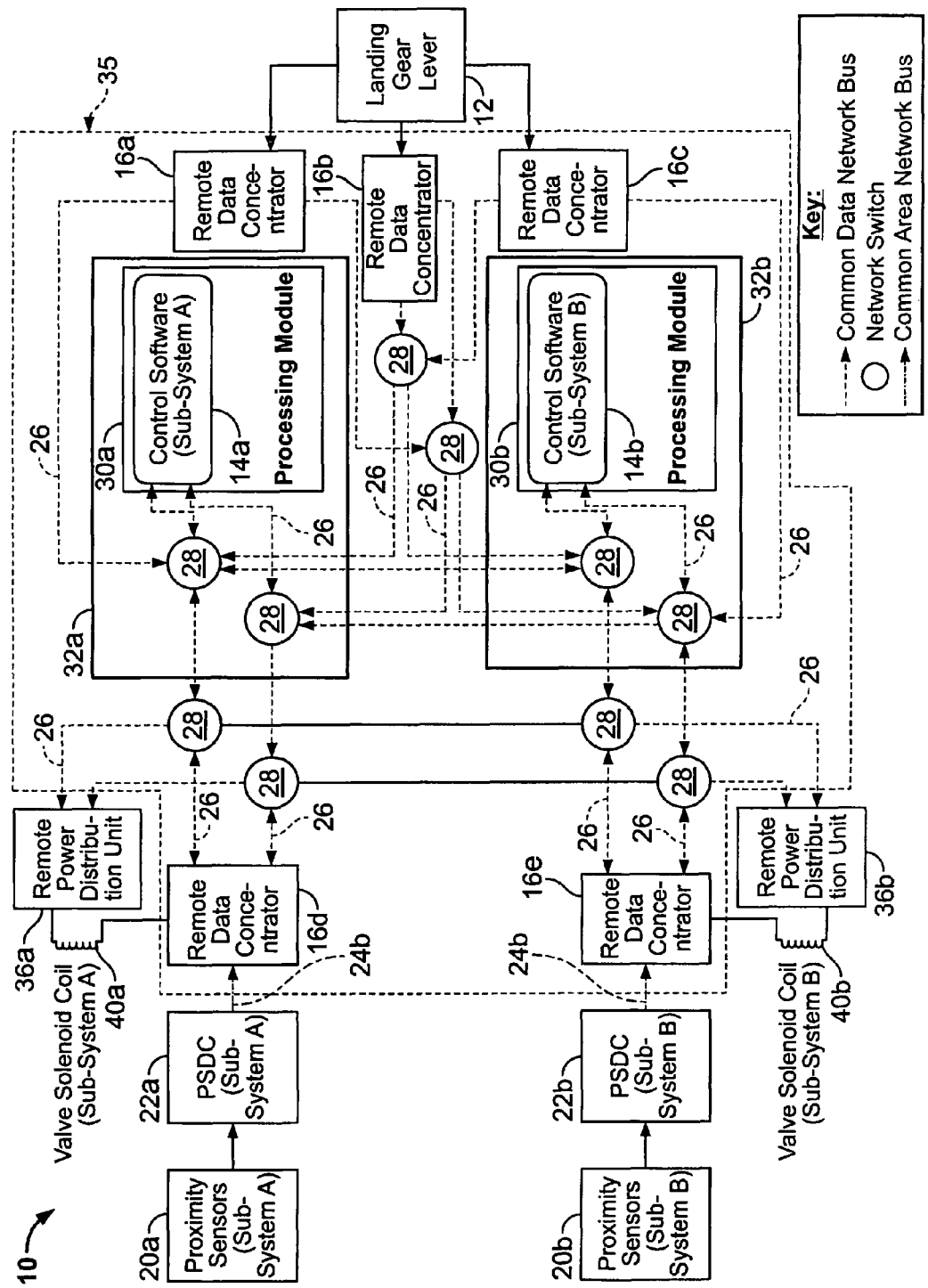

ELECTRICALLY ACTIVATED AIRCRAFT LANDING GEAR CONTROL SYSTEM AND METHOD

FIELD OF THE INVENTION

The present invention relates generally to landing gear systems of an aircraft and more particularly to electrically controlled landing gear systems.

BACKGROUND OF THE INVENTION

Conventional landing gear systems in aircraft are generally mechanically driven. In certain prior aircraft landing gear systems, the extension and retraction sequencing of the landing gear is done mechanically based on the position of valves connected to individual gears, doors and main landing gear trucks. The valves direct the flow of hydraulic fluid to actuators for retracting or extending the landing gear and opening or closing the landing gear doors and positioning the main landing gear trucks. The hydraulic fluid to power these actuators is supplied from a central hydraulic system. Such mechanically driven landing gear systems tend to increase the weight in the aircraft, especially in large-scale commercial passenger aircraft, as a significant number of valves and hydraulic tubing are required to operate such mechanically driven landing gear systems. Therefore, it is desirable to have a landing gear system design that will reduce the number of mechanical components needed (such as valves), decrease the amount of hydraulic tubing and thereby reduce the overall weight on the aircraft.

SUMMARY

An electrically activated landing gear control system is provided. A processing module of the landing gear control system is provided with landing gear control system software adapted to receive data relating to the position of a landing gear lever. Proximity sensors are coupled for communication with the processing module. The proximity sensors provide the landing gear control system software with position data relating to the landing gear. The landing gear control software is adapted to convert the data received from the landing gear lever and the data received from the proximity sensors to command signals. The command signals may be sent to remote power distribution units and data concentrator units to energize or de-energize solenoid coils of the electrically activated valves. The landing gear control system has the capability to command control valves electronically using a high integrity, modular control architecture. This allows for the utilization of a reduced set of control valves to minimize aircraft weight and allows use of control logic to optimize landing gear sequencing to improve system performance, dispatchability, integrity, and availability.

In another embodiment, a method of controlling landing gear of an aircraft is provided. Data relating to the position of a landing gear lever is sent to a processing module having landing gear control software. Proximity sensors are coupled with the processing module to provide the landing gear control system software with position data relating to the landing gear. Data received from the landing gear lever and data from the proximity sensors are converted to command signals to control electrically activated valves for the landing gear. The method of controlling landing gear advantageously allows optimum placement of a reduced set of control valves to minimize aircraft weight and allows use of control logic to optimize landing gear sequencing to improve system performance. A dual channel architecture may also be implemented to provide a high level of availability and aircraft dispatchability.

BRIEF DESCRIPTION OF THE DRAWINGS

FIG. 1 is a block diagram of an exemplary landing gear control system.

DETAILED DESCRIPTION

A landing gear control system for an aircraft is provided. A processing module of the landing gear control system stores landing gear control system software that receives data relating to the position of a landing gear lever. Proximity sensors at landing gear and wheel well areas of the aircraft are coupled for communication with the processing module to provide the landing gear control system software with position data relating to the landing gear. The landing gear control software converts the data received from the landing gear lever and the data received from the proximity sensors to command signals to control electrically activated valves associated with the landing gear. The command signals may be sent to a power distribution unit to provide electrical power to energize or de-energize solenoid coils of the electrically activated valves. In particular, the command signals may also be sent simultaneously to a remote data concentrator unit to complete an energization circuit in combination with the power distribution unit.

A proximity sensor data concentrator unit monitors the proximity sensors and communicates sensor state information to the common core system of the aircraft. The proximity sensor data concentrator unit sends the sensor state information via a common area network bus for receipt at a data concentrator unit. As seen, the data concentrator unit sends the sensor state information via common data network busses and networks switches to the processing module storing the landing gear control system software. The landing gear control system software operates as part of the common core system of the aircraft.

The landing gear control system software monitors electrical switches of the landing gear lever to determine the position of the landing gear lever. In one example, each of the electrical switches is coupled for communication to respective remote data concentrator units in which the data concentrator units communication the position of each electrical switch to the landing gear control system software. As provided herein, a pair of redundant sub-systems having a dual channel architecture may be implemented as part of the landing gear control system.

Referring to FIG. 1, a block diagram providing a functional representation of an exemplary landing gear control system 10 is shown. In this example, a landing gear lever 12 in the flight deck may be provided with multiple electrical switches. For example, landing gear lever 12 may have triple-redundant electrical switches (not shown) that the landing gear control system 10 uses for determining the position of the landing gear lever 12. Landing gear control system software 14 monitors these switches related for lever up and lever down positions to determine pilot command. The electrical switches are coupled to a remote data concentrator unit 16. For example, each of the three up switch and down switch pairs may be hardwired or otherwise connected for communication with a corresponding remote data concentrator unit 16A, 16B, 16C. The remote data concentrators 16A, 16B, 16C, in this example, communicate the position of each switch pair to the landing gear control system software 14. A remote data concentrator provides input/output (I/O) processing and data consolidation to minimize wire runs on the aircraft. Analog data is converted to digital and transmitted to its hosted function via a common data network. In addition, the remote data concentrator units 16 provide a variety of analog I/O to drive hardware owned by a hosted function. The landing gear control system software 14 then processes the input switch signals to produce high integrity data of the landing gear lever 12 position.

Proximity sensors 20 are positioned to be located at the landing gears and in the wheel well areas of the aircraft. In one example, proximity sensors 20 are located on nose landing gears, left main landing gears and right main landing gears and in the wheel well areas corresponding to the nose, left main and right main landing gears. The proximity sensors 20 provide position data of the landing gear and doors and main gear trucks relative to the extension and retracting sequencing of the gear. While performance of landing gear and gear door operations including extension and retraction of landing gear during aircraft flight actions are readily understood by those skilled in the art, further reference can be made to commonly owned U.S. Pat. No. 6,854,689 filed on Feb. 9, 2004, entitled "Methods and System for Operating Aircraft Landing Gears", which is incorporated by reference herein.

In the example shown in FIG. 1, landing gear control system 10 may be implemented having multiple sub-systems, such as sub-system A and sub-system B. In particular, FIG. 1 provides a functional representation example of a single sub-system A control channel and a single sub-system B control channel. The dual channel architecture provides a high level of availability and aircraft dispatch ability. As used herein, aircraft refers to any type of airplane, helicopter or other type of aircraft.

As seen in FIG. 1, a set of proximity sensors 20A, identified as sub-system A sensors, are coupled to a proximity sensor data concentrator unit 22A. Another set of proximity sensors 20B, identified as sub-system B sensors, are coupled to another proximity sensor data concentrator unit 22B. Proximity sensor data concentrators units 22A, 22B provide monitoring of proximity sensors 20A, 20B, for example, for use in landing gear sequencing. Proximity sensor data concentrator units 22A, 22B are stationed across the aircraft to concentrate sensor data as close to the actual sensor as possible and to minimize and simplify aircraft wiring. The proximity sensor data concentrator units contain the electronics to interface with passive proximity sensors. Excitation and monitoring of data received from the proximity sensors 20A, 20B is digitized by the proximity sensor data concentrator units 22A, 22B and transmitted to common computing resources (CCRs).

The proximity sensors 20A, 20B, of each sub-system, for example, may be wired to or otherwise implemented for communication with their respective proximity sensor data concentrator units 22A, 22B. In one example, a set of eleven proximity sensors may be used as sub-system A proximity sensors and another set of eleven proximity sensors may be used as sub-system B proximity sensors. In this instance, sub-systems A and B, for example, may each have a nose landing gear up proximity sensor; a nose landing gear down proximity sensor; a nose landing gear door open proximity sensor; a left main landing gear truck stowed proximity sensor; a left main landing gear up proximity sensor; a left main landing gear down proximity sensor; a left main landing gear door open proximity sensor; a right main landing gear stowed proximity sensor; a right main landing gear proximity sensor; a right main landing gear down proximity sensor; and a right main landing gear open proximity sensor. However, any number and arrangement of various proximity sensors may selectively be employed.

The proximity sensor data concentrator units 22A, 22B monitor the proximity sensors 20A, 20B and communicate sensor state information to the common core system 35 of the aircraft via common area network busses 24A, 24B and two corresponding remote data concentrator units 16D, 16E. The common area network busses 24A, 24B may be serial data busses. The remote data concentrator units 16D, 16E send this information via common data network busses 26 and network switches 28 to respective general processing modules 30A, 30B associated with sub-systems A and B. The common data network busses 26 are generally busses employed in the common data network. The common data network, in this example, may have a star topology with a set of distributed, redundant network switches. As seen, the common data network may be configured in a dual redundant arrangement. For example, two sets of independent network switches 28 any be provided forming an A and B channel to the network.

The general processing module units 30A, 30B may each contain a respective partition of the landing gear control system software 14A, 14B. Additionally, common computing resource (CCR) cabinets 32A, 32B, for example, may each contain a respective general processing module 30A, 30B with associated landing gear control system software partitions 14A, 14B stored therein. The utilization of multiple independent proximity sensor data concentrator units 22A, 22B, common area network busses 24A, 24B, remote data concentrators 16D, 16E, common computing resources 32A, 32B and general processing modules 30A, 30B provide a high degree of system availability and integrity. The common core system 35 is an integrated modular avionics architecture that provides a set of shared computing, networking and input/output resources to support the computing and system interface needs for multiple aircraft systems. In this example, the common core system 35 may comprise the common computing resource, the common data network, and the remote data concentrator. As seen, the common computing resource, for example, may be a modular and configurable design with a pair of common computing resource cabinets 32A, 32B.

As seen in the example set forth in FIG. 1, two landing gear control software partitions 14A, 14B are provided for the landing gear control system 10. Landing gear control software partition 14A for sub-system A may be housed in one common computing resource cabinet 32A, such as a left CCR cabinet. The landing gear control software 14A receives information from landing gear lever 12 and sub-system A proximity sensors 20A. Landing gear control software 14A may also receive information from other aircraft sources such as air speed, altitude and hydraulic system pressure and other aircraft sources. Landing gear control software 14A converts this information received to command signals that are sent to remote power distribution units 36A and remote data concentrators 16D to provide electrical power to energize or de-energize solenoid coils in electrically activated valves 40A associated with sub-system A.

Landing gear control software partition 14B for sub-system B may be housed in another CCR cabinet 32B, such as a right CCR cabinet. The landing gear control software 14B receives information from landing gear lever 12 and sub-system B proximity sensors 20B. Landing gear control software 14B may also receive information from other aircraft sources such as air speed, altitude and hydraulic system pressure and other aircraft sources. Landing gear control software 14B converts this information received to command signals that are sent to remote power distribution units 36B and remote data concentrators 16E to provide electrical power to energize or de-energize solenoid coils in electrically activated valves 40B associated with sub-system B. The command signals may be sent simultaneously to the data concentrator units 16D, 16E to complete an energization circuit in combination with the power distribution unit 36A, 36B.

Multiple independent remote power distribution units 36A, 36B and remote data concentrators 16D, 16E are used to provide a high degree of system availability and integrity. The remote power distribution system of the aircraft may use solid state power controllers housed in the remote power distribution units 36 to distribute power to aircraft electrical loads. For example, 28 VDC and 115 VAC power may be distributed to aircraft electrical loads. The remote power distribution units 36A, 36B are commanded via the common data network. For example, if one of the two landing gear control software partitions 14A, 14B has a failure or is disabled for any reason, then the other software partition can continue commanding extending and retracting the landing gear.

As seen, landing gear actuation control is performed by an integrated control system 10 having landing gear control lever 12, two independent control sub-systems (sub-system A and sub-system B), and solenoid operated control valves 40A, 40B. The landing gear control sub-systems are provided with software partitions 14A, 14B housed on the common computing resource 32A, 32B, data buses 24, 26, remote power distribution units 36A, 36B, remote data concentrators 16 A-E, proximity sensor data concentrators 22A, 22B, and proximity sensors 20A, 20B. The two control sub-systems act in parallel to command the solenoid operated control valves 40A, 40B to retract and extend the landing gear. Control of gear extension and retraction is performed by the landing gear control system software partitions 14A, 14B housed on the common computing resource 32A, 32B. Landing gear control software 14A for control sub-system A may be housed in the Left CCR 32A. Landing gear control software 14B for control system B may be housed in the Right CCR 32B. The landing gear control software partitions receive gear lever up/down data and gear and gear door position data from remote data concentrator units 16 via the common data network (CDN) of the aircraft. The landing gear control software 14A, 14B may issue, for example, gear sequencing commands to remote data concentrator units 16D, 16E and remote power distribution units 36A, 36B via the CDN buses 26. The remote power distribution units 36A, 36B and data concentrator units 16D, 16E may then, for example, provide 28 VDC power and ground paths respectively to solenoid operated control valves to retract and extend the landing gear, open and close the gear doors, and position the main landing gear trucks.

Electrically activated control for landing gear retraction and extension sequencing is provided. For example, for gear retraction, a pre-selected period of time after lift-off (e.g. one second), the main landing gear wheel well doors are automatically commanded open and the main landing gear trucks are commanded to the stow position. The landing gear control software 14A, 14B initiates opening the main landing gear wheel well doors and stowing the main landing gear trucks on lift-off to reduce the time from lever up to gear retracted and doors closed to improve the climb rate of the aircraft for obstacle limited takeoffs. If the flight crew does not move the landing gear to UP within a period of time, such as 10 seconds from lift-off, the main landing gear doors close and the main landing gear trucks may be positioned to the tilt position. When the landing gear lever is placed in the UP position, the nose landing gear forward wheel well doors may be commanded open.

In this landing gear retraction example, when the nose landing gear doors are nearly fully open, the nose landing gear is commanded to unlock and retract. The main landing gear are also commanded to unlock and retract if both main landing gear wheel well doors are nearly fully open and both main landing gear trucks are in the stowed position. If either main landing gear wheel well door is not nearly fully open or either main landing gear truck is not in the stowed position, the unlocking and retraction of the main landing gear may be delayed until both main landing gear wheel well doors are nearly fully open and both main landing gear trucks are in the stowed position. Once the nose landing gear is up and locked, the nose landing gear forward wheel well doors may be commanded to close and lock. The main landing gear wheel well doors may be commanded to close and lock when both main landing gear are up and locked. A pre-selected period of time after the nose landing gear doors and both main landing gear doors are closed and locked (e.g. ten seconds), the nose landing gear and main landing gear control valves may be commanded off isolating the nose landing gear and main landing gear actuation circuits from hydraulic system pressure. Both main landing gear may be sequenced together, for example. The nose landing gear may be sequenced independently of the main landing gear.

Gear extension control, for example, may be performed when the landing gear control lever is placed in the DOWN position to command gear extension. When the landing gear control lever is placed in the DOWN position, the nose landing gear forward wheel well doors and main landing gear wheel well doors may be commanded to unlock and open. In this example, once the nose landing gear forward wheel well doors are nearly fully open, the nose landing gear may be commanded to unlock from up. The main landing gear may be commanded to unlock from up when both main landing gear wheel well doors are nearly fully open. The main landing gear, for example, may be initially commanded to retract to unload the main landing gear uplocks prior to unlocking and extending. The nose landing gear and main landing gear may extend under the influence of airloads and gear weight. Once the nose landing gear is nearly down, the nose landing gear forward wheel well doors may be commanded to close. The main landing gear wheel well doors may be commanded to close and the trucks are commanded to tilt, when both main landing gear are nearly down. Both main landing gear are sequenced together. The nose landing gear may be sequenced independently of the main landing gear.

As seen herein, landing gear control system 10 has the capability to command control valves electronically using a high integrity, modular control architecture. This allows optimum placement of a reduced set of control valves to minimize airplane weight and allows use of control logic to optimize landing gear sequencing to improve system performance, dispatchability, integrity, and availability. The dual channel architecture provides a high level of availability and aircraft dispatchability. Both control channels (A, B) are continuously active. The use of independent and redundant channels, and by having simultaneous commands to both a remote power distribution unit 36 and a remote data concentrator unit 16 to energize a solenoid coil provides a high level of integrity to mitigate failure modes that would cause erroneous gear operation. Solenoid circuit monitoring protects for latent failures in the electrical landing gear control system 10.

The foregoing description of the preferred embodiments of the invention have been presented for purposes of illustration and description, and are not intended to be exhaustive or to limit the invention the precise forms disclosed. The descriptions were selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A landing gear control system for an aircraft comprising:
  a landing gear lever comprising a plurality of electrical switches;
  a processing module with landing gear control system software configured to determine a position of the landing gear lever by monitoring data from the plurality of electrical switches;
  a plurality of proximity sensors coupled with the processing module to provide the landing gear control system software with position data relating to landing gear; and
  wherein the landing gear control software converts the data received from the plurality of electrical switches and the position data received from the proximity sensors to command signals.

2. The landing gear control system of claim 1 wherein the command signals control electrically activated valves associated with the landing gear and further comprising a power distribution unit and solenoid coils of the electrically activated valves, wherein the command signals are sent to the power distribution unit to provide electrical power to energize or de-energize the solenoid coils of the electrically activated valves.

3. The landing gear control system of claim 2 further comprising a data concentrator unit, wherein the command signals are sent simultaneously to the data concentrator unit to complete an energization circuit in combination with the power distribution unit.

4. The landing gear control system of claim 2 wherein the landing gear control system software operates as part of a common core system of the aircraft.

5. The landing gear control system of claim 2 wherein the proximity sensors are positioned at landing gear and wheel well areas of the aircraft and are coupled to a proximity sensor data concentrator unit.

6. The landing gear control system of claim 5 wherein the proximity sensor data concentrator unit monitors the proximity sensors and communicates sensor state information to a common core system of the aircraft.

7. The landing gear control system of claim 6 wherein the proximity sensor data concentrator unit sends the sensor state information via a common area network bus for receipt at a data concentrator unit.

8. The landing gear control system of claim 7 wherein the data concentrator unit sends the sensor state information via common data network busses and network switches to the processing module storing the landing gear control system software.

9. The landing gear control system of claim 6 wherein each of the plurality of electrical switches are coupled to respective data concentrator units, and the data concentrator units communicate the position of each electrical switch to the landing gear control system software.

10. The landing gear control system of claim 6 wherein a plurality of redundant sub-systems are implemented for the landing gear control system.

11. The landing gear control system of claim 10 wherein the plurality of redundant sub-systems further comprise a pair of sub-systems having a dual channel architecture.

12. A method of controlling landing gear of an aircraft comprising:
  sending data from a plurality of electrical switches, relating to a position of a landing gear lever, to a processing module having landing gear control software which determines the position of the landing gear lever based on the data;
  sending position data, relating to the landing gear, from proximity sensors coupled with the processing module to the landing gear control system software which determines the position of the landing gear based on the position data; and
  converting, using the landing gear control system software, the data received from the plurality of electrical switches and the position data received from the proximity sensors to command signals.

13. The method of claim 12 further comprising sending the command signals to a power distribution unit to provide electrical power to energize or de-energize solenoid coils of electrically activated valves associated with the landing gear.

14. The method of claim 13 further comprising sending the command signals to a data concentrator unit to complete an energization circuit in combination with the power distribution unit.

15. The method of claim 13 wherein the landing gear control system software operates as part of a common core system of the aircraft.

16. The method of claim 13 further comprising positioning the proximity sensors at landing gear and wheel well areas of the aircraft and coupling the proximity sensors to a proximity sensor data concentrator unit.

17. The method of claim 16 wherein the proximity sensors data concentrator unit monitors the proximity sensors and communicates sensor state information to a common core system of the aircraft.

18. The method of claim 17 further comprising sending the sensor state information from the proximity sensor data concentrator unit via a common area network bus for receipt at a data concentrator unit.

19. The method of claim 18 further comprising sending the sensor state information via common data network busses and network switches to the processing module.

20. The method of claim 17 further comprising coupling the electrical switches to respective data concentrator units which communicate positions of the plurality of electrical switches to the landing gear control system software.

21. The method of claim 17 further comprising providing control of the landing gear through a redundant pair of sub-systems having a dual channel architecture.

22. The method of claim 12 wherein the landing gear lever comprises the plurality of electrical switches.

* * * * *

UNITED STATES PATENT AND TRADEMARK OFFICE
CERTIFICATE OF CORRECTION

| | | |
|---|---|---|
| PATENT NO. | : 8,175,762 B2 | Page 1 of 1 |
| APPLICATION NO. | : 12/018291 | |
| DATED | : May 8, 2012 | |
| INVENTOR(S) | : Steven J. Trotter, Beth L. Sundquist and Fredric R. Arslan | |

It is certified that error appears in the above-identified patent and that said Letters Patent is hereby corrected as shown below:

On the title page item (75) inventor: should read as follows: "Fredric R. Arslan"

Signed and Sealed this
Twenty-eighth Day of August, 2012

David J. Kappos
*Director of the United States Patent and Trademark Office*